(12) United States Patent
Morash et al.

(10) Patent No.: US 10,000,260 B2
(45) Date of Patent: Jun. 19, 2018

(54) SYSTEMS AND METHODS FOR PRESSURE TOLERANT ENERGY SYSTEMS

(71) Applicant: Hadal, Inc., Oakland, CA (US)

(72) Inventors: James Morash, Alameda, CA (US); Jonathan Pompa, Long Beach, CA (US); Ben Kfir, San Francisco, CA (US); Robert S. Damus, Alameda, CA (US); Richard J. Rikoski, Alameda, CA (US)

(73) Assignee: Hadal, Inc., Oakland, CA (US)

( * ) Notice: Subject to any disclaimer, the term of this patent is extended or adjusted under 35 U.S.C. 154(b) by 0 days. days.

(21) Appl. No.: 15/459,891

(22) Filed: Mar. 15, 2017

(65) Prior Publication Data

US 2017/0267319 A1   Sep. 21, 2017

Related U.S. Application Data

(63) Continuation of application No. 14/210,080, filed on Mar. 13, 2014, now Pat. No. 9,630,686.

(51) Int. Cl.
*H01M 14/00* (2006.01)
*B63B 35/40* (2006.01)
(Continued)

(52) U.S. Cl.
CPC .............. *B63B 35/40* (2013.01); *B22D 31/00* (2013.01); *B29C 44/3415* (2013.01); *B63B 3/13* (2013.01);
(Continued)

(58) Field of Classification Search
CPC ........... H01M 10/425; H01M 10/4257; H01M 10/4207; H01M 10/44; H01M 10/441;
(Continued)

(56) References Cited

U.S. PATENT DOCUMENTS 2,247,084 A   6/1941   Goff
3,435,794 A   4/1969   Pechacek
(Continued)

FOREIGN PATENT DOCUMENTS

EP   2492947 A1   8/2012
EP   2495746 A1   9/2012
(Continued)

OTHER PUBLICATIONS

Adams et al., "Technical Overview of a Safe, Configurable, Pressure Tolerant, Subsea Lithium Ion Battery System for Oil and Gas Deep Water Fields," retrieved from http://www.mtsjournal.org/Papers/PDFs/130508-003.pdf.

(Continued)

*Primary Examiner* — Raymond Alejandro
(74) *Attorney, Agent, or Firm* — White & Case LLP (57) ABSTRACT

Systems and methods are disclosed herein for a pressure tolerant energy system. The pressure tolerant energy system may comprise a pressure tolerant cavity and an energy system enclosed in the pressure tolerant cavity configured to provide electrical power to the vehicle. The energy system may include one or more battery cells and a pressure tolerant, programmable management circuit. The pressure tolerant cavity may be filled with an electrically-inert liquid, such as mineral oil. In some embodiments, the electrically-inert liquid may be kept at a positive pressure relative to a pressure external to the pressure tolerant cavity. The energy system may further comprise a pressure venting system configured to maintain the pressure inside the pressure tolerant cavity within a range of pressures. The pressure tolerant cavity may be sealed to prevent water ingress.

11 Claims, 5 Drawing Sheets

(51) Int. Cl.
*B22D 31/00* (2006.01)
*F17C 1/00* (2006.01)
*B63G 8/00* (2006.01)
*B63G 8/39* (2006.01)
*B29C 44/34* (2006.01)
*B63B 3/13* (2006.01)
*H01M 2/02* (2006.01)
*H01M 10/052* (2010.01)
*H01M 10/42* (2006.01)
*B63B 27/16* (2006.01)
*B63B 27/36* (2006.01)
*G01S 7/52* (2006.01)
*G01S 15/10* (2006.01)
*G01S 15/60* (2006.01)
*G01S 15/02* (2006.01)
*G01S 15/58* (2006.01)
*G01S 15/89* (2006.01)

(52) U.S. Cl.
CPC .............. *B63B 27/16* (2013.01); *B63B 27/36* (2013.01); *B63G 8/00* (2013.01); *B63G 8/001* (2013.01); *B63G 8/39* (2013.01); *F17C 1/00* (2013.01); *G01S 7/52004* (2013.01); *G01S 15/02* (2013.01); *G01S 15/104* (2013.01); *G01S 15/588* (2013.01); *G01S 15/60* (2013.01); *H01M 2/024* (2013.01); *H01M 2/025* (2013.01); *H01M 10/052* (2013.01); *H01M 10/4257* (2013.01); *B63B 2027/165* (2013.01); *B63B 2035/405* (2013.01); *B63G 2008/004* (2013.01); *B63G 2008/008* (2013.01); *G01S 15/107* (2013.01); *G01S 15/8904* (2013.01); *Y10T 29/49117* (2015.01); *Y10T 29/49826* (2015.01); *Y10T 29/49893* (2015.01); *Y10T 29/49989* (2015.01); *Y10T 29/5176* (2015.01); *Y10T 428/1352* (2015.01); *Y10T 428/1376* (2015.01)

(58) Field of Classification Search
CPC .... H01M 10/445; H01M 2/024; H01M 2/025; B63B 35/40; B63B 3/13; B63B 27/16; B63B 27/36; B63B 2209/00; B63G 8/00; B63G 8/001; B63G 8/39; Y10T 428/1352; Y10T 428/1376
See application file for complete search history.

(56) References Cited

U.S. PATENT DOCUMENTS

| | | | |
|---|---|---|---|
| 3,622,437 A | 11/1971 | Hobaica et al. | |
| 3,946,351 A | 3/1976 | Bronikowski et al. | |
| 4,012,708 A | 3/1977 | Goe, Jr. | |
| 4,202,036 A | 5/1980 | Bowditch et al. | |
| 5,487,350 A | 1/1996 | Chace, Jr. et al. | |
| 5,586,657 A | 12/1996 | Ward et al. | |
| 6,153,294 A | 11/2000 | Patton et al. | |
| 6,433,514 B1 | 8/2002 | McClure et al. | |
| 8,322,016 B2 | 12/2012 | Kirkham et al. | |
| 8,381,672 B1 | 2/2013 | Eriksen | |
| 2010/0185348 A1 | 7/2010 | Webb | |
| 2011/0187377 A1* | 8/2011 | Boysen | G01R 31/36 324/426 |
| 2013/0029191 A1* | 1/2013 | Byun | H01M 2/024 429/61 |

FOREIGN PATENT DOCUMENTS

| | | |
|---|---|---|
| GB | 1153248 | 5/1969 |
| WO | WO-1993017334 | 9/1993 |
| WO | WO-2008000305 | 1/2008 |
| WO | WO-2011017734 A1 | 2/2011 |
| WO | WO-2012095123 A1 | 7/2012 |

OTHER PUBLICATIONS

AUVAC Power System Detail, Retrieved from http://auvac.org/batteries/view/1.
Bluefin Robotics 1.5 kWh Subsea Battery Product Sheet; retrieved from <http://www.bluefinrobotics.com/assets/Downloads/Bluefin-Battery-Product-Sheet.pdf>.
Hasvold et al., "Exposure of lithium batteries to external hydrostatic pressure," Paper, 42nd Power Sources Conference, Philadelphia, PA Jun. 12-15, 2006; retrieved from http://www.ffi.no/no/Publikasjoner/Documents/Exposure%20of%20lithium%20batteries%20to%20external%20hydrostatic%20pressure.pdf.
Hasvold et al., "Power sources for autonomous underwater vehicles," Journal of Power Sources, 162:935-942 (2006). Retrieved from http://202.114.89.60/resource/pdf/2480.pdf.
HUGIN Product Specification, retrieved from http://www.km.kongsberg.com/ks/web/nokbg0397.nsf/AllWeb/76ABD1760DA9C064C1257B470029C7A5/$file/382309_hugin_product_specification.pdf?OpenElement.
McPhail, "Autusub6000: A Deep Diving Long Range AUV," retrieved from <http://nora.nerc.ac.uk/165907/1/Autosub6000_McPhail_for_USYS08_paper_FINAL.pdf>.
Newsletter of the Planned Autonomous Vehicle Facility, No. 2, Sep. 2011, retrieved from <http://noc.ac.uk/f/content/downloads/2012/MARS%20Newsletter%20No2.pdf>.
Phoenix International Lithium Ion Battery Modules, retrieved from http://auvac.org/uploads/manufacturer_spec_sheet_pdf_power/Phoenix%20PT%20Lithium%20Ion%20Battery%20Rev%20a10.pdf.
Robinson, "Li-Poly Pressure-Tolerant Batteries Dive Deep," downloaded from <http://www.batterypoweronline.com/images/PDFs_articles_whitepaper_appros/Bluefin%20Robotics.pdf>.
Wilson et al., "Development and Experience of a Practical, Pressure-Tolerant, Lithium Battery for Underwater Use," OCEANS 2006 (Sep. 2006). Retrieved from http://ieeexplore.ieee.org/xpl/login.jsp?tp=&arnumber=4099136&url=http%3A%2F%2Fieeexplore.ieee.org%2Fiel5%2F4098824%2F4098825%2F04099136.pdf%3Farnumber%3D4099136.
Wilson et al., "Pressure—Tolerant Lithium Polymer Batteries", downloaded from <http://www.bluefinrobotics.com/assets/Papers/Lithium%20Battery%20Technology_Wilson_April%202009.pdf>.

* cited by examiner

SYSTEMS AND METHODS FOR PRESSURE TOLERANT ENERGY SYSTEMS

CROSS-REFERENCE TO RELATED APPLICATIONS

This application is a continuation of U.S. application Ser. No. 14/210,080, filed on Mar. 13, 2014 (now U.S. Pat. No. 9,630,686), which claims the benefit of priority from U.S. Provisional Ser. No. 61/792,708, filed on Mar. 15, 2013, the contents of which are incorporated by reference herein in their entirety.

BACKGROUND

The past several decades have seen a steady increase in the number of unmanned underwater robotic systems deployed for use in the ocean. All of these systems are equipped with energy systems including batteries to accomplish their respective mission.

The primary factors that affect mission duration and sensor payload capability include the overall energy density of a battery module, measured in Watt-hours per kilogram of module mass (Wh/kg); equally important for certain cell chemistries (e.g., Lithium Ion) is circuitry used in the management of the battery components. Underwater robotic systems, especially flooded-hull type systems, require a ruggedized, pressure tolerant energy system capable of operating at all ocean depths.

SUMMARY

Systems and methods are disclosed herein for a pressure tolerant energy system. According to one aspect, an underwater vehicle may comprise one or more buoyancy elements, a pressure tolerant cavity, and an energy system enclosed in the pressure tolerant cavity configured to provide electrical power to the vehicle. The energy system may include one or more neutrally buoyant battery cells. In some embodiments, the battery cells may have an average density that is about equal to the density of the fluid in which the vehicle is immersed. The vehicle may also comprise a pressure tolerant, programmable management circuit.

In some embodiments, the one or more battery cells may be positioned on a tray, wherein the tray provides structural support, alignment, and electrical insulation for the one or more battery cells. In some embodiments, the tray may be made from thermoformed plastic. The one or more battery cells may employ any suitable battery chemistry, including, but not limited to, lithium, lithium polymer, and lithium sulfur. In some embodiments, the one or more battery cells may be neutrally buoyant. A neutrally buoyant battery or group of batteries can have an average density that is about equal to the density of the fluid in which the vehicle is immersed. One advantage to using a neutrally buoyant battery or batteries is that the need for additional buoyancy material can be substantially reduced. Another advantage is that with less space devoted to buoyancy foam the vehicle can hold more batteries, increasing endurance. Also, the weight of an underwater vehicle can be reduced, thereby, enabling less power consumption to maneuver the vehicle or maintain the vehicle at certain depths. Furthermore, as the amount of buoyancy material is reduced, more space can be available for other equipment or systems. In some implementations, the one or more batteries include a lithium sulfur (Li—S) battery or variant thereof.

In some embodiments, the pressure tolerant cavity is filled with an electrically-inert liquid. The electrically inert liquid may be mineral oil. In some embodiments, the electrically-inert liquid may be kept at a positive pressure relative to a pressure external to the pressure tolerant cavity. In some embodiments, the energy system may further comprise a pressure venting system. The pressure venting system may maintain the pressure inside the pressure tolerant cavity at a specific pressure. The pressure tolerant cavity may be sealed to prevent water ingress.

In some embodiments, the management circuit may comprise a water-intrusion detection circuit board. The water-intrusion detection circuit board may comprise a conductive trace, wherein the resistance of the conductive trace drops in the presence of water.

In some embodiments, a backplane may connect the one or more cells and the management circuit. The backplane may provide structural support and alignment for the one or more battery cells. The backplane, management circuit, and the one or more battery cells may be connected to a communication network. In some embodiments, the one or more battery cells may be connected to a temperature sensor and configured to communicate at least a voltage and a temperature to the programmable management circuit.

Other objects, features, and advantages of the present invention will become apparent upon examining the following detailed description, taken in conjunction with the attached drawings.

BRIEF DESCRIPTION OF THE FIGURES

The systems and methods described herein are set forth in the appended claims. However, for purpose of explanation, several illustrative embodiments are set forth in the following figures.

DETAILED DESCRIPTION

To provide an overall understanding of the invention, certain illustrative embodiments will now be described. However, it will be understood by one or ordinary skill in the art that the systems and methods described herein can be adapted and modified for other suitable applications and that such other additions and modifications will not depart from the scope hereof.

Systems and methods are described herein directed towards pressure tolerant battery systems (also referred to herein as "energy systems") that are oil filled, ruggedized, waterproof, and capable of operating at the ocean depths.

The electrodes of a typical lithium polymer pouch cell are flimsy tabs of thin metal, ultrasonically welded or heat bonded to an aluminized mylar envelope. These tabs are unable to carry load and are prone to mechanical failure if stressed. These tabs may be more securely connected to a rigid circuit board by rivets that puncture the tabs and securely fix the tabs to large area circuit board traces so that the electrodes can be brought to a robust connector. They may also be spot welded, soldered, or clamped to the aforementioned circuit board. This method of attachment may increase the mechanical life of the cell, provides for a well-defined current path through an arbitrary connector, and decreases assembly time for production.

Typical rectangular form factor lithium polymer cells are subject to failure through mechanical insult to their aluminized mylar envelope, aka "pouch." In order to prevent pouch damage during normal operation of the battery system, a carrier card may be used to relieve the mechanical load off the cell and protect the fragile outer edges of the cell. Cells may be first connectorized, and then bonded to the carrier card plate. The cell carrier card may be bonded to the connector circuit board to prevent movement of the tabs relative to the rest of the battery. Bonding may be placed to allow hydrostatic shrinkage of components without stressing.

In some embodiments, the carrier card may be slightly larger than the form factor of the cell to ensure that the fragile hermetically sealed edge of the cell never experiences load. The cell carrier card may have a slot so that a thermocouple may be affixed to the cell for the purpose of measuring temperature. The carrier card may be made of fire retardant composite material that helps prevent fire propagation of thermal events from isolated cell failure.

The properties of battery systems comprised of individual cells are the sum whole of those cell properties; therefore cell packaging efficiency, namely how many cells fit into a battery enclosure, is the primary factor that determines the energy density of a battery.

The internal layout of the energy system may be a "card cage" type design with cells supported and constrained by an assembly of trays. The trays may be vertically stacked and made from thermoformed ABS plastic or fiberglass. The trays may also include top, bottom, and side plates. These components may be rigidly held in place with a bar machined to act as a spine, thus preventing out-of-plane motion of the cell tray stack. In some embodiments, the battery and/or the cells are positioned on its side inside the vehicle.

This card cage design with spine may increase packing efficiency, enabling increased energy density, while simultaneously decoupling the internal mechanical structure from affecting or damaging the cell functionality. In some embodiments, individual lithium-polymer cells may be connectorized, placed in thermoformed ABS trays, stacked vertically, and plug into a battery management backplane, which covers one face of the cell stack.

The thermoformed ABS plastic trays may be manufactured to be slightly larger than the form factor of the cell so the cell can rest on a cell carrier card. The trays may carry the structural loading (i.e., weight) of the stack of cells, and therefore protect against acceleration and impact. The trays may also act as spacers, providing separation between cells and enabling a medium such as mineral oil in the battery enclosure to flow around the cell. This flow may provide heat transfer convection away from the cell.

Battery systems used in the ocean environments may comprise individual cells immersed in oil to provide insulation and heat transfer. These energy systems may comprise a formidable enclosure to ensure operation of the enclosed cells when submerged in sea water. Such an enclosure may have no path for water ingress, be corrosion resistant, provide for gross access of cells and internal circuitry through a lid during service periods, and have a means of venting built up internal pressure. In addition, all conduit or service paneling may be watertight.

In some embodiments, a ruggedized, pressure tolerant battery system may comprise a seamless, welded, corrosion resistant stainless steel box which encloses a battery cell assembly. The enclosure may have holes to provide for rapid venting of internal pressure. In some embodiments, the enclosure may have a removable lid with an oil resistant gasket, which may be sealed with a four-part high pressure clamp. This lid may be of a form factor to house the battery management electronics and may provide pass-through (penetration) ports for power, serial data communication, and/or oil-filling. The lid may be large enough to provide for internal cable routing from the cell stack to the battery management circuitry and on through the power & data penetrator. In some embodiments, there may be a "bleed port" hole located on the top of the removable lid that may be large enough to provide a path for trapped air to escape during filling the enclosure with oil. This bleed port may be capped with a screw containing an oil-resistant o-ring seal.

In order to prevent individual cell short circuit, the battery system internal structure may be book ended with structurally significant plates designed to prevent interaction with the ruggedized enclosure. These plates may prevent the cell envelope from being compromised, which will prevent short circuiting of the cell stack. The plates may serve dual purpose as locators for the cell tray stack within the footprint of the enclosure.

In some embodiments, an inert liquid, such as mineral oil, may be used to fill the battery enclosure. The inert liquid may act as a pressure barrier with the sea water and may not affect electronics operation. To reduce the chances that water enters the enclosure through possible leak paths, the inert liquid may be maintained at a positive pressure relative to the ambient pressure the battery system feels at a given depth. In some embodiments, the enclosure may be independently compensated by a pressure compensator. In some embodiments, the pressure compensator is a rolling diaphragm piston compensator. In another embodiment, the pressure compensator is integral to the enclosure volume as a spring loaded diaphragm. In another embodiment, the compensator is integral to the enclosure as a flexible member of the enclosure providing its own spring force, such as a flexible urethane panel in a face of the enclosure or a domed urethane cap. In another embodiment the compensator is a bladder of oil that sits under the battery, with the battery's weight providing the pressurizing force. (this embodiment may not work for a neutrally buoyant battery). The battery enclosure and pressure compensator may be filled with the same liquid, such as a light mineral oil. One compensator per battery pack may avoid contamination when battery packs are used in aggregate and one fails. The pressure compensators may be fitted with tubing that connect to an oil-fill port of the battery pack. The tubing may be terminated with quick disconnect fittings so the compensators do not leak when not attached to the battery pack and can be serviced independently from the batteries they serve.

The port and starboard faces of the module enclosure may each have an integral safety vent facing broadside near a vehicle centerline. The safety vents may consist of flange-mounted, neoprene gasket-sealed stainless/Teflon burst discs (e.g., 3" diameter) which serve as safety vents in the event of cell failure leading to thermal runaway. The burst discs may be factory calibrated to rupture at predetermined pressure, less than the module's stainless steel enclosure.

Water is detrimental to the operation of a battery. In some embodiments, a water-intrusion detection circuit board may be placed at the top and/or bottom of a cell stack to detect water intrusion. These "leak detect" boards may be circuit boards that fit within the internal boundaries of the battery enclosure and may be mounted to the top and bottom plates. The leak detect circuit may comprise an alternating positive/negative electrode print that traces a route along the four edges of the leak detect board. The resistance of this circuit may be monitored by the management system. The electrode pattern may be closely spaced so that when a small drop of water comes to rest on the circuit board between a pair of electrodes, the resistance measured by the circuit drops precipitously. In this manner, the resistance may be used as a signal to the management circuitry that an ingress event has been detected.

The battery system may comprise its own independent electronics management circuitry. The cells may be connected via card carriers in groups to one or more cell backplane (CBP) circuit boards, which may be monitored by a Battery Manager (BMGR) board at the top of the cell stack. The separate BMGR boards may be connected to a communication network, such as a higher-level RS-485 network, which provides communication between the battery system and a control computer (during mission), or the charge control computer (pre- or post-mission).

The CBPs may be configured to continuously or periodically collect individual cell voltage and temperature data. Every cell voltage may be measured by an isolated analog to digital converter. Every cell temperature may be measured by an independent thermistor probe. The CBPs may report voltage and temperature data for its complement of cells to the BMGR. The reporting interval may be faster when the battery is active (charging or discharging) than when the battery is idle (standby). To manage graceful failure of the system, a CBP may assert a fault interrupt to the BMGR, causing an immediate shutdown of the charge input and discharge output.

The BMGR may be configured to interface with the outside world and to protect the battery (by disconnecting the charge input and/or discharge output) if voltage or temperature safety limits are exceeded. The BMGR may shut down the battery immediately if it detects any individual cell voltage above the max cell voltage, or if any individual cell temperature exceeds a manufacturer recommended maximum temperature. The BMGR may disable charging of the battery system if any cell temperature is below a manufacturer recommended minimum temperature. The BMGR may disable discharging of the battery system if any cell temperature is below a manufacturer recommended minimum temperature for discharge, which may differ from the charge limit temperature. An over-discharge protection feature may be activated at any time, which will also shut down the battery if any individual cell voltage drops below a manufacturer recommended minimum cell voltage. To prevent an over-current condition, the battery system may be equipped with a pressure tolerant fuse in series with the positive terminal, and the BMGR may provide a controllable dual disconnect (high and low side switches). Further details regarding an exemplary pressure tolerant fuse are provided in U.S. Patent Application Publication No. 2012/0281503, the entire contents of which are incorporated herein by reference. This provides a safety feature by requiring two concurrent failures to happen before an uncommanded output voltage can be presented at the battery output.

The assembly of a battery system comprised of multiple cell units may require an accurate mechanical apparatus to provide temporary support for the internals, including the management circuitry, cell stack, and protective paneling. The cell stack may be built up prior to insertion in the enclosure so that electrical testing and quality assurance of the entire cell stack is accomplished prior to insertion in the ruggedized enclosure. The cell stack build up may be accomplished through the use of a jig that holds the cell backplane cards in place while cell carrier cards are inserted into the cell stack. The cell stack may be built up upside down to facilitate interfacing the battery management circuitry, which is typically one of the last steps in assembly.

Once the cell stack is built and tested, the battery enclosure may be lowered onto the stack and positioned in place through the use of spacer blocks. The completed stack and enclosure may then be flipped right side up through the use of the "battery flipper," a thin walled cantilevered tubular structure that is affixed to the battery enclosure by locking bolts. Once right side up, the battery pack lid assembly, oil filling, and final testing may commence.

Figure 1:
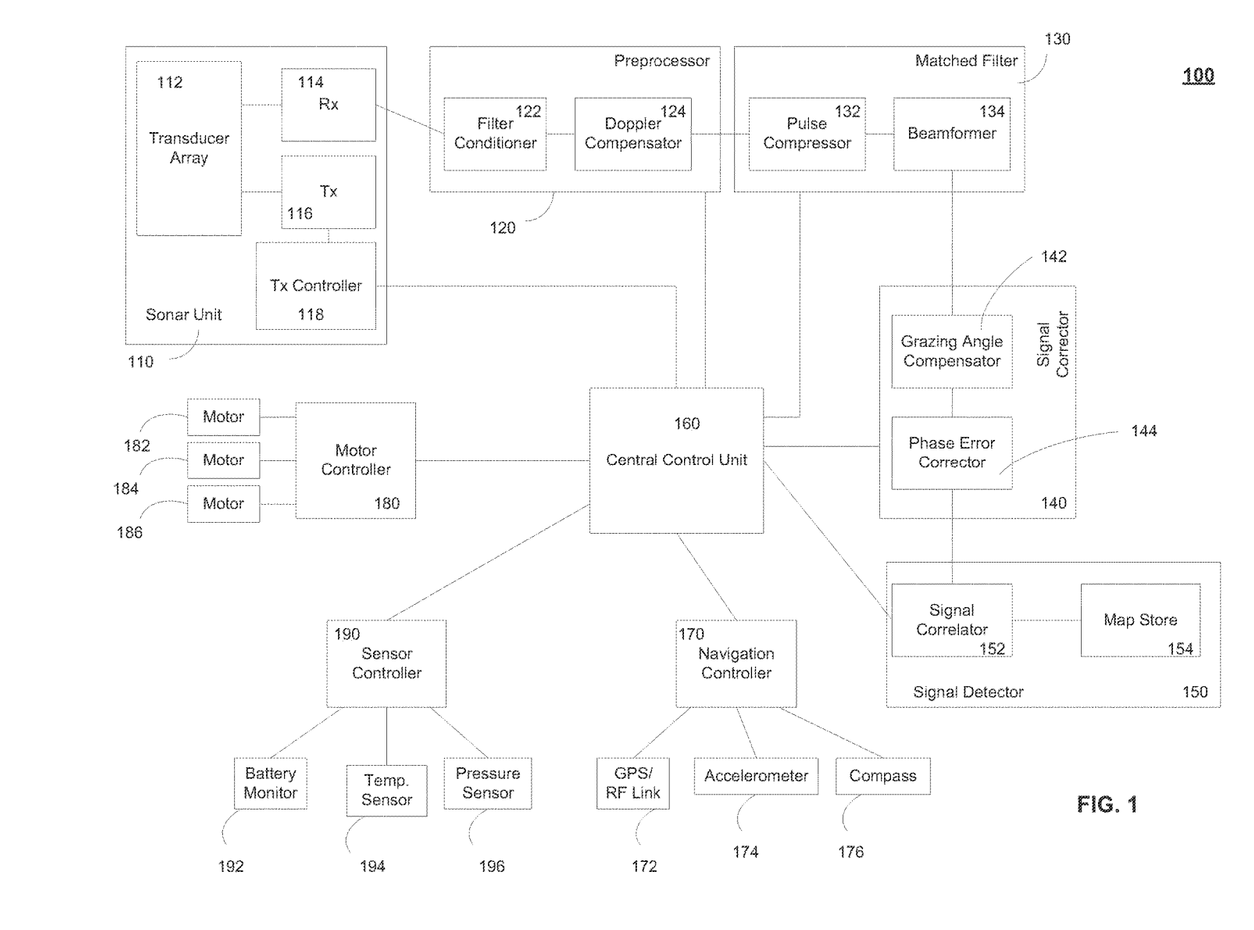
FIG. 1 is a block diagram depicting an exemplary remote vehicle, according to an illustrative embodiment of the present disclosure.

FIG. 1 is a block diagram depicting an illustrative remote vehicle, according to an illustrative embodiment of the present disclosure. The system 100 includes a sonar unit 110 for sending and receiving sonar signals, a preprocessor 120 for conditioning a received (or reflected) signal, and a matched filter 130 for performing pulse compression and beamforming. The system 100 is configured to allow for navigating using high-frequency (greater than about 100 kHz) sonar signals. To allow for such HF navigation, the system 100 includes a signal corrector 140 for compensating for grazing angle error and for correcting phase error. The system 100 also includes a signal detector 150 for coherently correlating a received image with a map. In some embodiments, the system 100 includes an on-board navigation controller 170, motor controller 180 and sensor controller 190. The navigation controller 170 may be configured to receive navigational parameters from a GPS/RF link 172 (when available), an accelerometer 174, a gyroscope, and a compass 176. The motor controller 180 may be configured to control a plurality of motors 182, 184 and 186 for steering the vehicle. The sensor controller 190 may receive measurements from the battery monitor 172, a temperature sensor 194 and a pressure sensor 196. The system 100 further includes a central control unit (CCU) 160 that may serve as a hub for determining navigational parameters based on sonar measurements and other navigational and sensor parameters, and for controlling the movement of the vehicle.

In the context of a surface or underwater vehicle, the CCU 160 may determine navigational parameters such as position (latitude and longitude), velocity (in any direction), bearing, heading, acceleration and altitude. The CCU 160 may use these navigational parameters for controlling motion along the alongtrack direction (fore and aft), acrosstrack direction (port and starboard), and vertical direction (up and down). The CCU 160 may use these navigational parameters for controlling motion to yaw, pitch, roll or otherwise rotate the vehicle. During underwater operation, a vehicle such as an AUV may receive high-frequency real aperture sonar images or signals at sonar unit 110, which may then be processed, filtered, corrected, and correlated against a synthetic aperture sonar (SAS) map of the terrain. Using the correlation, the CCU may then determine the AUV's position, with high-precision and other navigational parameters to assist with navigating the terrain. The precision may be determined by the signal and spatial bandwidth of the SAS map and/or the acquired sonar image. In certain embodiments, assuming there is at least a near perfect overlap of the sonar image with a prior SAS map with square pixels, and assuming that the reacquisition was performed with a single channel having a similar element size and bandwidth, and assuming little or no losses to grazing angle compensation, the envelope would be about one-half the element size. Consequently, in certain embodiments, the peak of the envelope may be identified with high-precision, including down to the order of about $1/100^{th}$ of the wavelength. For example, the resolution may be less than 2.5 cm, or less than 1 cm or less than and about 0.1 mm in the range direction.

As noted above, the system 100 includes a sonar unit 110 for transmitting and receiving acoustic signals. The sonar unit includes a transducer array 112 having a one or more transmitting elements or projectors and a plurality of receiving elements arranged in a row. In certain embodiments the transducer array 112 includes separate projectors and receivers. The transducer array 112 may be configured to operate in SAS mode (either stripmap or spotlight mode) or in a real aperture mode. In certain embodiments, the transducer array 112 is configured to operate as a multibeam echo sounder, sidescan sonar or sectorscan sonar. The transmitting elements and receiving elements may be sized and shaped as desired and may be arranged in any configuration, and with any spacing as desired without departing from the scope of the present disclosure. The number, size, arrangement and operation of the transducer array 112 may be selected and controlled to insonify terrain and generate high-resolution images of a terrain or object. One example of an array 112 includes a 16 channel array with 5 cm elements mounted in a 12¾ inch vehicle.

The sonar unit 110 further includes a receiver 114 for receiving and processing electrical signals received from the transducer, and a transmitter 116 for sending electrical signals to the transducer. The sonar unit 110 further includes a transmitter controller 118 for controlling the operation of the transmitter including the start and stop, and the frequency of a ping.

The signals received by the receiver 114 are sent to a preprocessor for conditioning and compensation. Specifically, the preprocessor 120 includes a filter conditioner 122 for eliminating outlier values and for estimating and compensating for hydrophone variations. The preprocessor further includes a Doppler compensator 124 for estimating and compensating for the motion of the vehicle. The preprocessed signals are sent to a matched filter 130.

The matched filter 130 includes a pulse compressor 132 for performing matched filtering in range, and a beamformer 134 for performing matched filtering in azimuth and thereby perform direction estimation.

The signal corrector 140 includes a grazing angle compensator 142 for adjusting sonar images to compensate for differences in grazing angle. Typically, if a sonar images a collection of point scatterers the image varies with observation angle. For example, a SAS system operating at a fixed altitude and heading observing a sea floor path will produce different images at different ranges. Similarly, SAS images made at a fixed horizontal range would change if altitude were varied. In such cases, changes in the image would be due to changes in the grazing angle. The grazing angle compensator 142 is configured to generate grazing angle invariant images. One such grazing angle compensator is described in U.S. patent application Ser. No. 12/802,454 titled "Apparatus and Method for Grazing Angle Independent Signal Detection," the contents of which are incorporated herein by reference in their entirety.

The signal corrector 140 includes a phase error corrector 144 for correcting range varying phase errors. Generally, the phase error corrector 144 breaks the image up into smaller pieces, each piece having a substantially constant phase error. Then, the phase error may be estimated and corrected for each of the smaller pieces.

The system 100 further includes a signal detector 150 having a signal correlator 152 and a storage 154. The signal detector 150 may be configured to detect potential targets, estimate the position and velocity of a detected object and perform target or pattern recognition. In one embodiment, the storage 154 may include a map store, which may contain one or more previously obtained SAS images real aperture images or any other suitable sonar image. The signal correlator 152 may be configured to compare the received and processed image obtained from the signal corrector 140 with one or more prior images from the map store 154.

The system 100 may include other components, not illustrated, without departing from the scope of the present disclosure. For example, the system 100 may include a data logging and storage engine. In certain embodiments the data logging and storage engine may be used to store scientific data which may then be used in post-processing for assisting with navigation. The system 100 may include a security engine for controlling access to and for authorizing the use of one or more features of system 100. The security engine may be configured with suitable encryption protocols and/or security keys and/or dongies for controlling access. For example, the security engine may be used to protect one or more maps stored in the map store 154. Access to one or more maps in the map store 154 may be limited to certain individuals or entities having appropriate licenses, authorizations or clearances. Security engine may selectively allow these individuals or entities access to one or more maps once it has confirmed that these individuals or entities are authorized. The security engine may be configured to control access to other components of system 100 including, but not limited to, navigation controller 170, motor controller 180, sensor controller 190, transmitter controller 118, and CCU 160.

Figure 2:
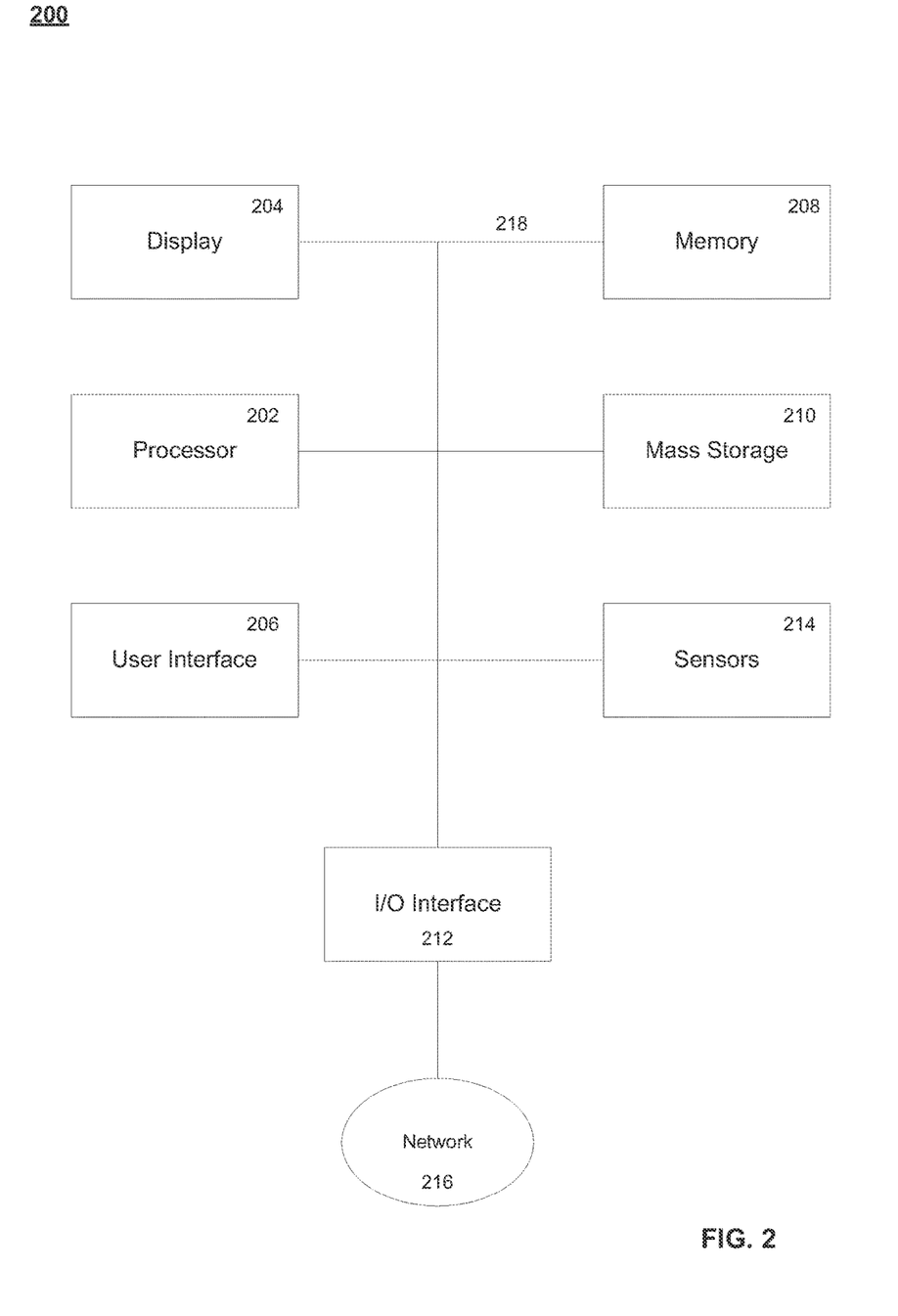
FIG. 2 is block diagram of an exemplary computer system for implementing at least a portion of the systems and methods described in the present disclosure.

Generally, with the exception of the transducer 112, the various components of system 100 may be implemented in a computer system, such as computer system 200 of FIG. 2. More particularly, FIG. 2 is a functional block diagram of a general purpose computer accessing a network according to an illustrative embodiment of the present disclosure. The holographic navigation systems and methods described in this application may be implemented using the system 200 of FIG. 2.

The exemplary system 200 includes a processor 202, a memory 208, and an interconnect bus 218. The processor 202 may include a single microprocessor or a plurality of microprocessors for configuring computer system 200 as a multi-processor system. The memory 208 illustratively includes a main memory and a read-only memory. The system 200 also includes the mass storage device 210 having, for example, various disk drives, tape drives, etc. The main memory 208 also includes dynamic random access memory (DRAM) and high-speed cache memory. In operation and use, the main memory 208 stores at least portions of instructions for execution by the processor 202 when processing data (e.g., model of the terrain) stored in main memory 208.

In some embodiments, the system 200 may also include one or more input/output interfaces for communications, shown by way of example, as interface 212 for data communications via the network 216. The data interface 212 may be a modem, an Ethernet card or any other suitable data communications device. The data interface 212 may provide a relatively high-speed link to a network 216, such as an intranet, internee, or the Internet, either directly or through another external interface. The communication link to the network 216 may be, for example, any suitable link such as an optical, wired, or wireless (e.g., via satellite or 802.11 Wi-Fi or cellular network) link. In some embodiments, communications may occur over an acoustic modem. For instance, for AUVs, communications may occur over such a modem. Alternatively, the system 200 may include a mainframe or other type of host computer system capable of web-based communications via the network 216.

In some embodiments, the system 200 also includes suitable input/output ports or may use the Interconnect Bus 218 for interconnection with a local display 204 and user interface 206 (e.g., keyboard, mouse, touchscreen) or the like serving as a local user interface for programming and/or data entry, retrieval, or manipulation purposes. Alternatively, server operations personnel may interact with the system 200 for controlling and/or programming the system from remote terminal devices (not shown in the Figure) via the network 216.

In some embodiments, a system requires a processor, such as a navigational controller 170, coupled to one or more coherent sensors (e.g., a sonar, radar, optical antenna, etc.) 214. Data corresponding to a model of the terrain and/or data corresponding to a holographic map associated with the model may be stored in the memory 208 or mass storage 210, and may be retrieved by the processor 202. Processor 202 may execute instructions stored in these memory devices to perform any of the methods described in this application, e.g., grazing angle compensation, or high frequency holographic navigation.

The system may include a display 204 for displaying information, a memory 208 (e.g., ROM, RAM, flash, etc.) for storing at least a portion of the aforementioned data, and a mass storage device 210 (e.g., solid-state drive) for storing at least a portion of the aforementioned data. Any set of the aforementioned components may be coupled to a network 216 via an input/output (I/O) interface 212. Each of the aforementioned components may communicate via interconnect bus 218.

In some embodiments, the system requires a processor coupled to one or more coherent sensors (e.g., a sonar, radar, optical antenna, etc) 214. The sensor array 214 may include, among other components, a transmitter, receive array, a receive element, and/or a virtual array with an associated phase center/virtual element.

Data corresponding to a model of the terrain, data corresponding to a holographic map associated with the model, and a process for grazing angle compensation may be performed by a processor 202. The system may include a display 204 for displaying information, a memory 208 (e.g., ROM, RAM, flash, etc.) for storing at least a portion of the aforementioned data, and a mass storage device 210 (e.g., solid-state drive) for storing at least a portion of the aforementioned data. Any set of the aforementioned components may be coupled to a network 216 via an input/output (I/O) interface 212. Each of the aforementioned components may communicate via interconnect bus 218.

In operation, a processor 202 receives a position estimate for the sensor(s) 214, a waveform or image from the sensor(s) 214, and data corresponding to a model of the terrain, e.g., the sea floor. In some embodiments, such a position estimate may not be received and the process performed by processor 202 continues without this information. Optionally, the processor 202 may receive navigational information and/or altitude information, and a processor 202 may perform a coherent image rotation algorithm. The output from the system processor 202 includes the position to which the vehicle needs to move to.

The components contained in the system 200 are those typically found in general purpose computer systems used as servers, workstations, personal computers, network terminals, portable devices, and the like. In fact, these components are intended to represent a broad category of such computer components that are well known in the art.

It will be apparent to those of ordinary skill in the art that methods involved in the systems and methods of the invention may be embodied in a computer program product that includes a non-transitory computer usable and/or readable medium. For example, such a computer usable medium may consist of a read only memory device, such as a CD ROM disk, conventional ROM devices, or a random access memory, a hard drive device or a computer diskette, a flash memory, a DVD, or any like digital memory medium, having a computer readable program code stored thereon.

Optionally, the system may include an inertial navigation system, a Doppler sensor, an altimeter, a gimbling system to fixate the sensor on a populated portion of a holographic map, a global positioning system (GPS), a long baseline (LBL) navigation system, an ultrashort baseline (USBL) navigation, or any other suitable navigation system.

Figure 3:
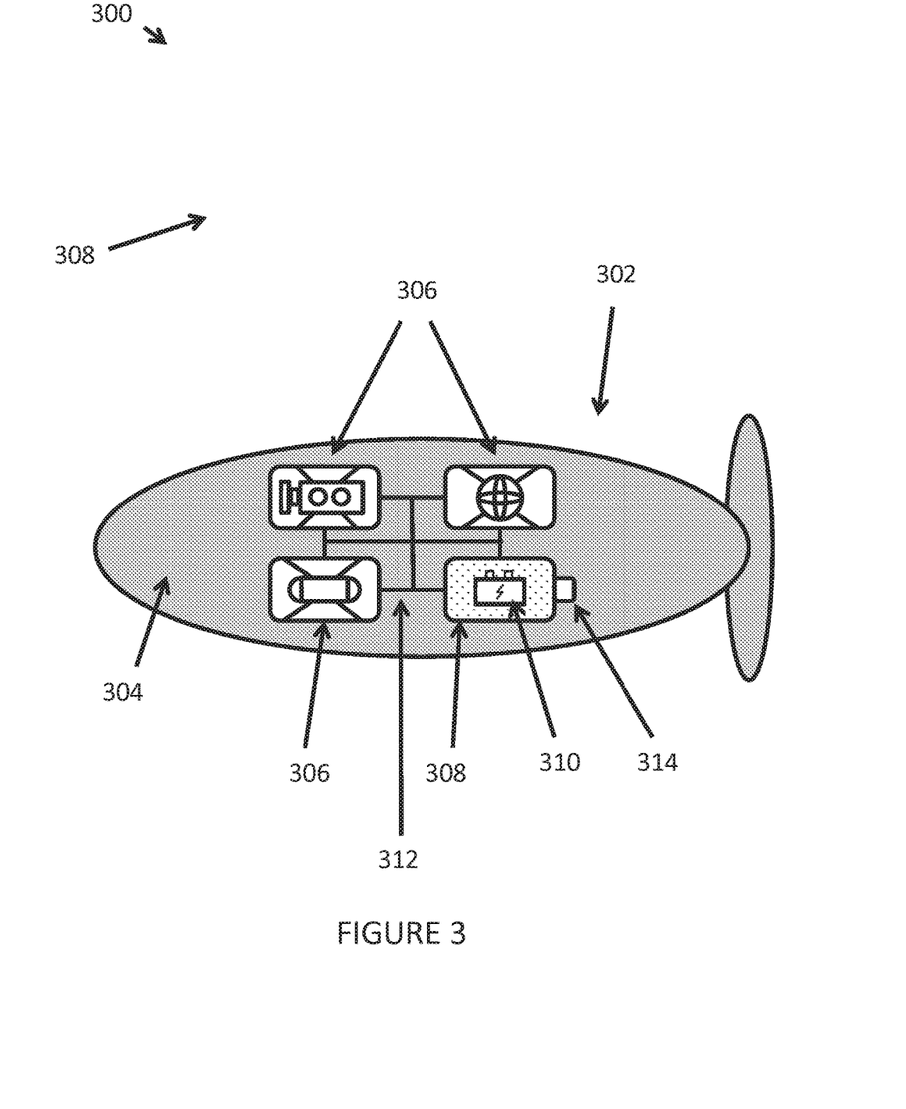
FIG. 3 depicts an underwater vehicle, according to one illustrative embodiment.

FIG. 3 depicts an underwater vehicle, according to one illustrative embodiment. The underwater vehicle 300 includes a hull 302, a buoyant material 304, a plurality of cavities 306, a pressure tolerant cavity 308, an energy system 310, an energy distribution system 312, and a pressure compensator 314.

Underwater vehicle 300 may be any vehicle for use in aqueous systems, including, but not limited to, an autonomous underwater vehicle (AUV), a remotely operated vehicle (ROV), a buoy, or an exploratory robot. Hull 302 may be made from any suitable material, including, but not limited to, carbon fiber or fiberglass. The vehicle 300 may employ a monocoque structure, wherein the hull 302 serves as an external skin supported by buoyant material 304. In some embodiments, the material 304 may be a buoyant foam, such as syntactic foam. The buoyant material 304 may be machined to fit the shape of hull 302. In some materials, the hull 302 may be pressure resistant, such that the space inside the hull 302 is kept at a different pressure than the ambient pressure outside of the hull 302. In alternate embodiments, the hull 302 may be open to the ambient environment. For example, the hull 302 may be a free flooded hull which allows ocean water to flow freely through the cavities 306.

The buoyant material 304 may be configured to have one or more cavities 306 and 308. In some embodiments, the cavities 306 and 308 may be specifically shaped to incorporate one or more components or instruments. For example, instead of first placing a component in the vehicle 300 and fitting foam around the component, the cavities 306 and 308 may be first cut into the buoyant material 304, and the component may be fit into the custom-cut cavity.

Pressure tolerant cavity 308 may be sealed to prevent water ingress. The cavity 308 may be resistant to pressure change. For example, if the hull 302 is a free-flooded type, the pressure tolerant cavity 308 may resist compression from the ambient ocean pressure. The pressure tolerant cavity may be filled with an electrically-inert liquid. In some embodiments, the electrically inert liquid may be mineral oil. In some embodiments, the electrically-inert liquid may be kept at a positive pressure relative to a pressure external to the pressure tolerant cavity. The cavity 308 may include a pressure compensator 314 to regulate the internal pressure of the cavity 308 to a specified pressure.

The energy system 310 may be connected to energy distribution system 312 and configured to delivery electrical energy to the various components and instruments in vehicle 302. The energy distribution system 312 may comprise any suitable distribution system, such as insulated electrical wires. The energy distribution system 312 may be insulated to water ingress and pressure-resistant.

Figure 4:
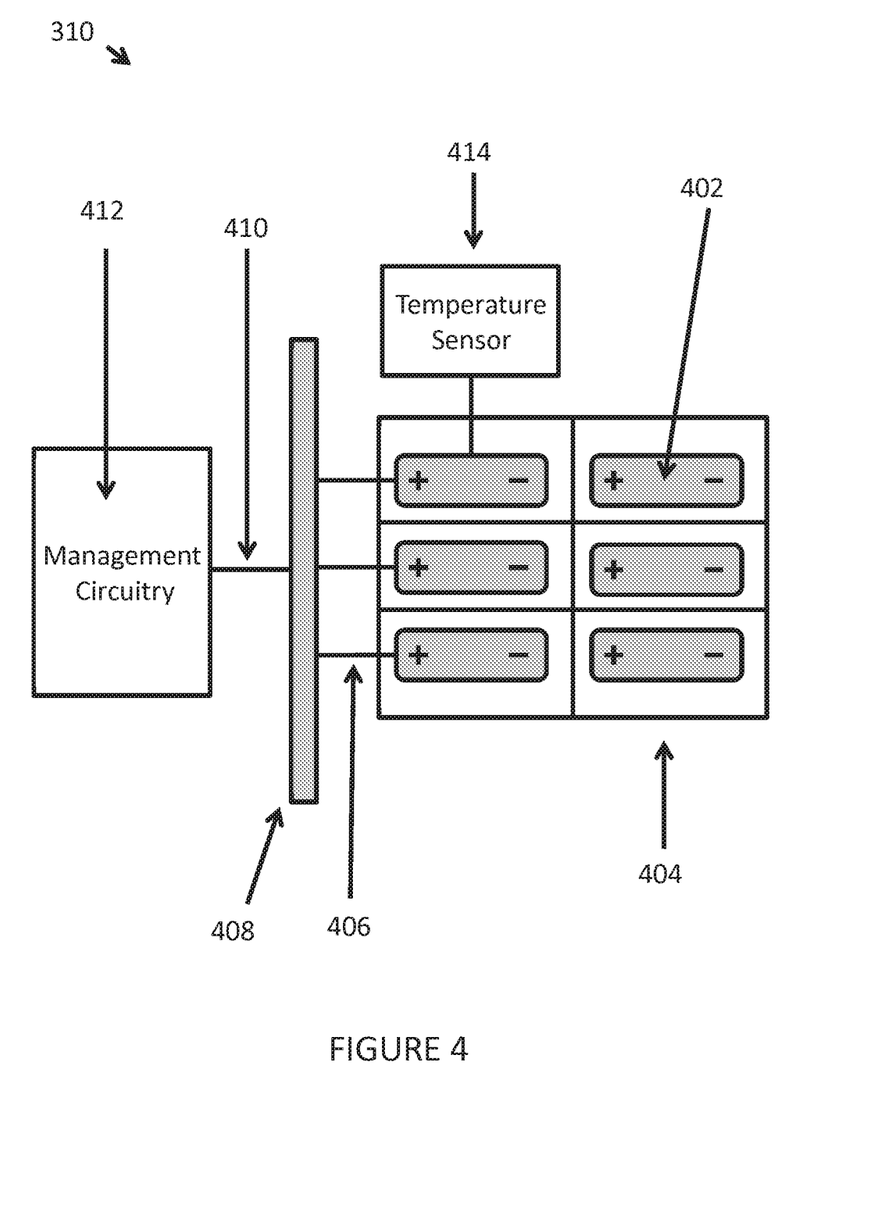
FIG. 4 depicts an illustrative pressure tolerant energy system.

FIG. 4 depicts an illustrative pressure tolerant energy system, such as the pressure tolerant energy system 310 depicted in FIG. 3. The pressure tolerant energy system 310 may comprise one or more battery cells 402, tray 404, electrical connections 406, backplane 408, communication network 410, management circuitry 412, and optionally, a temperature sensor 414.

The battery cells 402 may comprise any suitable battery for providing energy to an underwater vehicle, including, but not limited to, a lithium battery, lithium-ion battery, lithium polymer battery, or a lithium sulfur battery. In some embodiments, the battery cells 402 may be neutrally buoyant (e.g., compared to fresh water or sea/ocean water). Although the battery cells 402 are depicted in FIG. 4 in a 3×2 matrix, the battery cells 402 may be arranged, aligned, or positioned in any suitable arrangement. In some embodiments, the battery cells 402 may be stacked on top of each other. In such embodiments, the battery cells 402 may include a separator between each vertically-stacked cell.

The battery cells 402 may be placed into tray 404. The tray 404 may be made from any suitable material, such as thermoformed plastic. The tray 404 may provide structural support, alignment, and electrical insulation for the battery cells 402.

The battery cells 402 may be electrically and/or structurally connected to backplane 408. The backplane may provide both structural support and alignment for the battery cells 402. The backplane may also connect to an energy distribution system, such as energy distribution system 312 depicted in FIG. 3. In alternate embodiments, the battery cells 402 may be connected directly to an energy distribution system.

The backplane may connect the battery cells 402 to the management circuitry 412. In alternate embodiments, battery cells 402 may be directly connected to the management circuitry 412. In some embodiments, the battery cells 402 may be connected to management circuitry 412 through communication network 410. Communication network 410 may be any suitable network for communicating control signals. The management circuitry 412 may comprise a pressure tolerant circuit board that may be manually programmed using any suitable programming language. In some embodiments, a temperature sensor may be connected to the battery cells 402, either directly or through backplane 408. The battery cells 402 may be configured to communicate cell health information, including at least a voltage and temperature, to the management circuitry 412. The management circuitry 412 may include a water-intrusion detection circuit board, which may comprise a conductive trace that drops in resistance in the presence of water.

Figure 5:
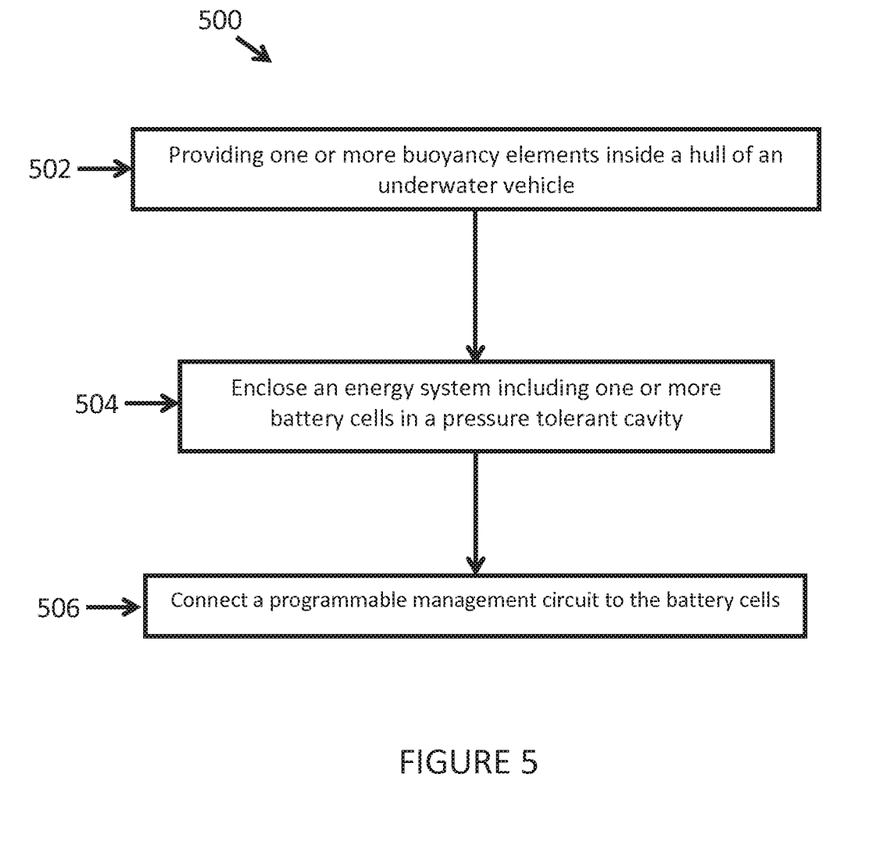
FIG. 5 depicts a process for providing electrical power to an underwater vehicle, according to one illustrative embodiment.

FIG. 5 depicts a process for providing electrical power to an underwater vehicle, according to one illustrative embodiment. Process 500 includes providing one or more buoyancy elements inside a hull of an underwater vehicle at step 502, enclosing an energy system including one or more battery cells in a pressure tolerant cavity at step 504, and connecting a programmable management circuit to the battery cells at step 506.

At step 502, one or more buoyancy elements may be provided inside the hull of an underwater vehicle. In some embodiments, the buoyancy elements may comprise a buoyant foam, such as a syntactic foam, configured to fill the interior of the vehicle hull. An illustrative example of a buoyancy element is depicted in FIG. 3 as buoyant material 304.

At step 504, an energy system including one or more battery cells may be enclosed in a pressure tolerant cavity. The pressure tolerant cavity may be sealed to prevent water ingress. The pressure tolerant cavity may be resistant to pressure change. For example, if the vehicle hull is a free-flooded type, the pressure tolerant cavity may resist compression from the ambient ocean pressure. The pressure tolerant cavity may be filled with an electrically-inert liquid. In some embodiments, the electrically inert liquid may be mineral oil. In some embodiments, the electrically-inert liquid may be kept at a positive pressure relative to a pressure external to the pressure tolerant cavity. The pressure tolerant cavity may include a pressure compensator to regulate the internal pressure of the cavity to a specified pressure.

At step 506, a programmable management circuit may be connected to the one or more battery cells. The programmable management circuit may monitor the cell health of the one or more battery cells, including voltage and temperature information. The management circuitry may comprise a pressure tolerant circuit board that may be manually programmed using any suitable programming language. The management circuitry may also include a water-intrusion detection circuit board, which may comprise a conductive trace that drops in resistance in the presence of water.

It will be apparent to those skilled in the art that such embodiments are provided by way of example only. It should be understood that numerous variations, alternatives, changes, and substitutions may be employed by those skilled in the art in practicing the invention. Accordingly, it will be understood that the invention is not to be limited to the embodiments disclosed herein, but is to be understood from the following claims, which are to be interpreted as broadly as allowed under the law.

What is claimed is:

1. A pressure tolerant battery system, the battery system comprising:
    a pressure tolerant cavity;
    a battery cell enclosure positioned within the pressure tolerant cavity;
    a pressure compensator regulating a pressure of the pressure tolerant cavity;
    a cell stack within the battery cell enclosure, wherein the cell stack has a positive terminal and a negative terminal;
    a pressure tolerant fuse in series with the positive terminal; and
    a battery manager board at one end of the cell stack, wherein the battery manager board provides a controllable dual disconnect at the positive terminal or the negative terminal,
    wherein the pressure tolerant fuse and the battery manager board are both configured to prevent an over-current condition.

2. The pressure tolerant battery system of claim 1, further comprising:
    a housing configured to house the pressure tolerant fuse within the battery cell enclosure, and further configured to resist external hydrostatic pressure.

3. The pressure tolerant battery system of claim 2, the housing further comprising:

a central section housing the pressure tolerant fuse;

at least one end cap and at least one o-ring seal, sealing the housing against liquids or gases; and at least one spring, connecting the pressure tolerant fuse to the housing.

4. The pressure tolerant battery system of claim 3, wherein the central section is made of rigid insulating material and the at least one end cap and the at least one spring are made of an electrically conductive material.

5. The pressure tolerant battery system of claim 3, wherein the pressure tolerant cavity is sealed to prevent water ingress.

6. The pressure tolerant battery system of claim 3, wherein the pressure tolerant cavity is resistant to pressure change.

7. The pressure tolerant battery system of claim 3, wherein the pressure regulator regulates the internal pressure of the pressure tolerant cavity to a specified pressure.

8. The pressure tolerant battery system of claim 3, wherein the pressure tolerant cavity is a hull of an autonomous underwater vehicle.

9. The pressure tolerant battery system of claim 8, wherein the pressure compensator maintains a space inside the hull at a different pressure than an ambient pressure outside of the hull.

10. The pressure tolerant battery system of claim 1, wherein the pressure of the pressure tolerant cavity is configured to resist compression from an ambient ocean pressure.

11. The pressure tolerant battery system of claim 1, wherein the pressure of the pressure tolerant cavity is a positive pressure relative to a pressure external to the pressure tolerant cavity.

* * * * *

UNITED STATES PATENT AND TRADEMARK OFFICE
CERTIFICATE OF CORRECTION

PATENT NO. : 10,000,260 B2  
APPLICATION NO. : 15/459891  
DATED : June 19, 2018  
INVENTOR(S) : James Morash et al.

Page 1 of 1

It is certified that error appears in the above-identified patent and that said Letters Patent is hereby corrected as shown below:

On the Title Page

Below the heading entitled Related U.S. Application Data, after item (63) please insert the following:
--(60) Provisional application No. 61/792,708, filed on March 15, 2013--

Signed and Sealed this
Eighteenth Day of September, 2018

Andrei Iancu
*Director of the United States Patent and Trademark Office*